US007596992B2

(12) United States Patent
Asano et al.

(10) Patent No.: US 7,596,992 B2
(45) Date of Patent: Oct. 6, 2009

(54) FUEL INJECTION CONTROL APPARATUS DESIGNED TO COMPENSATE FOR DEVIATION OF QUANTITY OF FUEL SPRAYED FROM FUEL INJECTOR

(75) Inventors: Masahiro Asano, Kariya (JP); Eiji Takemoto, Oobu (JP); Yuuki Tarusawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/174,183

(22) Filed: Jul. 16, 2008

(65) Prior Publication Data

US 2009/0030590 A1 Jan. 29, 2009

(30) Foreign Application Priority Data

Jul. 25, 2007 (JP) ............................ 2007-193685

(51) Int. Cl.
*G01M 15/00* (2006.01)
*F02D 41/30* (2006.01)

(52) U.S. Cl. .................... 73/114.48; 123/486; 123/674; 701/104; 701/114

(58) Field of Classification Search ................. 123/674, 123/486; 73/114.48; 701/104, 114
See application file for complete search history.

(56) References Cited

U.S. PATENT DOCUMENTS

| | | | | |
|---|---|---|---|---|
| 5,839,420 | A * | 11/1998 | Thomas | 123/478 |
| 6,216,668 | B1 * | 4/2001 | Haugen | 123/320 |
| 6,679,222 | B1 * | 1/2004 | Reischl et al. | 123/305 |
| 6,732,577 | B2 * | 5/2004 | Leman et al. | 73/114.48 |
| 6,748,928 | B2 * | 6/2004 | Shingole | 123/480 |
| 6,907,861 | B2 | 6/2005 | Asano et al. | |
| 7,069,138 | B2 * | 6/2006 | Bohnig et al. | 701/104 |
| 7,333,886 | B2 * | 2/2008 | Bohnig et al. | 701/114 |
| 2004/0089273 | A1 * | 5/2004 | Tonetti et al. | 123/480 |
| 2004/0267434 | A1 * | 12/2004 | Asano et al. | 701/104 |
| 2007/0112502 | A1 | 5/2007 | Asano et al. | |
| 2009/0107227 | A1 * | 4/2009 | Ishizuka et al. | 73/114.74 |

FOREIGN PATENT DOCUMENTS

| | | |
|---|---|---|
| JP | 2005-036788 | 2/2005 |
| JP | 2007-138750 | 6/2007 |

* cited by examiner

*Primary Examiner*—Erick Solis
(74) *Attorney, Agent, or Firm*—Nixon & Vanderhye, PC

(57) ABSTRACT

A fuel injection control apparatus for an internal combustion engine is provided. A controller directs a fuel injector to spray a learning injection quantity of fuel and determines a resulting increase in speed of the engine. The controller determines the quantity of the fuel actually sprayed from the fuel injector based on the increase in speed of the engine and calculates a correction factor which compensates for a difference between the learning injection quantity and the actual injection quantity. The controller also determines a variation in load acting on a driving member of a torque transmission mechanism. When such a variation is great undesirably, the controller stops spraying the learning injection quantity. The controller may determine the increase in speed of the engine based on the degree of the variation in load. This ensures the accuracy in calculating the correction factor regardless of the variation in load.

17 Claims, 4 Drawing Sheets

FUEL INJECTION CONTROL APPARATUS DESIGNED TO COMPENSATE FOR DEVIATION OF QUANTITY OF FUEL SPRAYED FROM FUEL INJECTOR

CROSS REFERENCE TO RELATED DOCUMENT

The present application claims the benefit of Japanese Patent Application No. 2007-193685 filed on Jul. 25, 2007, the disclosure of which is incorporated herein by reference.

BACKGROUND OF THE INVENTION

1. Technical Field of the Invention

The present invention relates generally to a fuel injection control apparatus for an internal combustion engine which may be employed in a common rail fuel injection system designed to learn the quantity of fuel injected into the engine to correct or compensate for a difference between a target quantity of fuel to be sprayed from a fuel injector and a quantity of fuel actually sprayed from the fuel injector.

2. Background Art

Fuel injection systems are known which are designed to learn a variation in quantity of fuel sprayed from fuel injectors due to the aging thereof and correct a control signal to be outputted to the fuel injector so as to compensate for such a variation. For example, Japanese Patent First Publication Nos. 2005-36788 (U.S. Pat. No. 6,907,861 B2 assigned to the same assignee as that of this application) and 2007-138750 (US 2007/0112502 A1) teach such compensating techniques. Particularly, fuel injection systems for diesel engines designed to perform the pilot injection before the main injection in order to reduce NOx emissions and burning noises are required to learn the quantity of fuel actually injected into the engine to ensure the accuracy in spraying a small quantity of fuel through fuel injectors.

The fuel injection system, as taught in Japanese Patent First Publication No. 2005-36788 (U.S. Pat. No. 6,907,861 B2), works to output a control signal to a fuel injector to spray a learning quantity of fuel into the engine and monitor a resulting change in speed of the engine to calculate the quantity of fuel actually sprayed by the fuel injector for correcting the control signal so as to compensate for a difference between the learning quantity and the actual quantity.

The fuel injection system, as taught in Japanese Patent First Publication No. 2007-138750 (US 2007/0112502 A1), is designed to output a control signal to a fuel injector to spray a learning quantity of fuel into an internal combustion engine, calculate a rate of slippage in rotation between a driving and a driven member of a power train through which output torque of the engine is transmitted, and determine the quantity of fuel actually sprayed from the fuel injector based on a rise in speed of the engine and the rate of slippage to correct the control signal so as to compensate for a difference between the learning quantity and the actual quantity.

However, direct addition of variation in physical load to the driving member of the power train or indirect thereof to the driven member will cause an increase in speed of the engine arising from the injection of the learning quantity of fuel thereinto to change as compared to when the variation in load is not exerted on the driving member or the driven member, thus resulting in an error in calculating the actual quantity of fuel injected into the engine based on the change in speed of the engine. This leads to an error in determining the correction factor based on the difference between the learning quantity and the actual quantity of fuel injected into the engine.

SUMMARY OF THE INVENTION

It is therefore a principal object of the invention to avoid the disadvantages of the prior art.

It is another object of the invention to provide a fuel injection control apparatus designed to learn a correction factor accurately for use in compensating for a difference between a target quantity of fuel and an actual quantity of fuel sprayed by a fuel injector into an internal combustion engine in view of a variation in physical load acting on a driving member of a torque transmission mechanism.

According to one aspect of the invention, there is provided a fuel injection control apparatus for an internal combustion engine which may be employed in a common rail fuel injection system for diesel engines. The fuel injection control apparatus comprises: (a) a speed sensor that measures a speed of an internal combustion engine; (b) a controller working to control a quantity of fuel to be injected from a fuel injector into the internal combustion engine. When it is required to enter an injection quantity learning mode, the controller actuates the fuel injector to spray a learning injection quantity of the fuel that is a quantity of the fuel to be injected into the internal combustion engine for learning a fuel injection characteristic of the fuel injector. The controller determines an increase in speed of the internal combustion engine through the speed sensor which has arisen from spraying of the learning injection quantity of the fuel and also determines an actual injection quantity of the fuel that is an quantity of the fuel considered as having been sprayed from the fuel injector based on the increase in speed of the internal combustion engine. The controller calculates a correction factor based on a difference between the learning injection quantity and the actual injection quantity for compensating for the difference. The controller also determines a variation in load acting on a driving member of a torque transmission mechanism through which an output torque of the internal combustion engine is transmitted from the driving member to a driven member. When an absolute value of the variation in load is greater than a given value, the controller halts the injection quantity learning mode.

Specifically, when the degree of variation in load acting on the driving member is great, it will result in a decrease in accuracy in learning the quantity of fuel sprayed from the fuel injector. In such an event, the controller inhibits the fuel injector from spraying the learning quantity of fuel, thus ensuring the learning accuracy.

In the preferred mode of the invention, the controller determines the increase in speed of the internal combustion engine based on the speed of the internal combustion engine, as measured by the speed sensor, and the variation in load acting on the driving member.

The controller may determine the variation in load acting on the driving member based on a change in speed of the internal combustion engine between before and after the learning injection quantity of the fuel is sprayed.

When a load-generating object connected directly to the driving member is actuated, the controller determines that the variation in load is exerted on the driving member and also determines whether the absolute value of the variation in load is greater than the given value or not.

When an output from a brake sensor indicates depression of a brake pedal for the internal combustion engine, the controller may determine that the variation in load is exerted on the driving member and also determine whether the absolute value of the variation in load is greater than the given value or not.

When a gear of a transmission installed in the torque transmission mechanism is changed, the controller may determine that the variation in load is exerted on the driving member and also determine whether the absolute value of the variation in load is greater than the given value or not.

The controller may alternatively calculate the absolute value of the variation in load acting on the driving member based on a difference in speed between before and after the learning injection quantity of the fuel is sprayed by the fuel injector.

The variation in load acting on the driving member is either of a positive variation in load oriented to decrease the speed of the internal combustion engine or a negative variation in load oriented to increase the speed of the internal combustion engine. The controller determines at least the positive variation in load which is highly likely to appear on the driving member during the injection quantity leaning mode.

In a case where an automatic transmission is installed in the torque transmission mechanism, and a lock-up clutch establishes a direct mechanical connection between the driving member and the driven member or where a manual transmission is installed in the torque transmission mechanism and connects the driving member and the driven member using a clutch without any slippage in rotation therebetween, the driven member will rotates together with the driving member, thus causing a great degree of torsion or a variation in physical load to be exerted on the driving and driven members. This results in a variation in speed of the engine even when the quantity of fuel sprayed from the fuel injector is constant. Consequently, the controller may determine whether the driving member and the driven member are slipping in rotation or not. When it is determined that the driving member and the driven member are slipping in rotation, that is, when the variation in load is not transmitted directly from the driven member to the driving member, the controller enters the injection quantity learning mode, thereby ensuring the accuracy in determining the correction factor based on the increase in speed of the engine.

According to another aspect of the invention, there is provided a fuel injection control apparatus for an internal combustion engine which comprises: (a) a speed sensor that measures a speed of an internal combustion engine; (b) a controller working to control a quantity of fuel to be injected from a fuel injector into the internal combustion engine. When it is required to enter an injection quantity learning mode, the controller directs the fuel injector to spray a learning injection quantity of the fuel that is a quantity of the fuel to be injected from the fuel injector to the internal combustion engine for learning a fuel injection characteristic of the fuel injector. The controller determines a variation in load acting on a driving member of a torque transmission mechanism through which an output torque of the internal combustion engine is transmitted from the driving member to a driven member. The controller also determines an increase in speed of the internal combustion engine through the speed sensor which has arisen from spraying of the learning injection quantity of the fuel based on the speed of the internal combustion engine, as measured by the speed sensor, and the variation in load acting on the driving member. The controller also determines an actual injection quantity of the fuel that is an quantity of the fuel considered as having been sprayed from the fuel injector based on the increase in speed of the internal combustion engine. The controller calculates a correction factor based on a difference between the learning injection quantity and the actual injection quantity to compensate for the difference for directing the fuel injector to spray a target quantity of the fuel.

Specifically, the controller determines the actual injection quantity in view of the increase in speed of the engine, thus ensuring the accuracy in driving the correction factor regardless of the variation in load acting on the driving member.

The modifications, as described above, may also be used with the second aspect of the invention.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(*b*) is a graph which demonstrates variations $\Delta\omega$ in speed of an internal combustion engine, as sampled when the acceleration pedal of the vehicle is released to decelerate the engine without spraying the fuel through fuel injectors;

DESCRIPTION OF THE PREFERRED EMBODIMENTS

Figure 1:
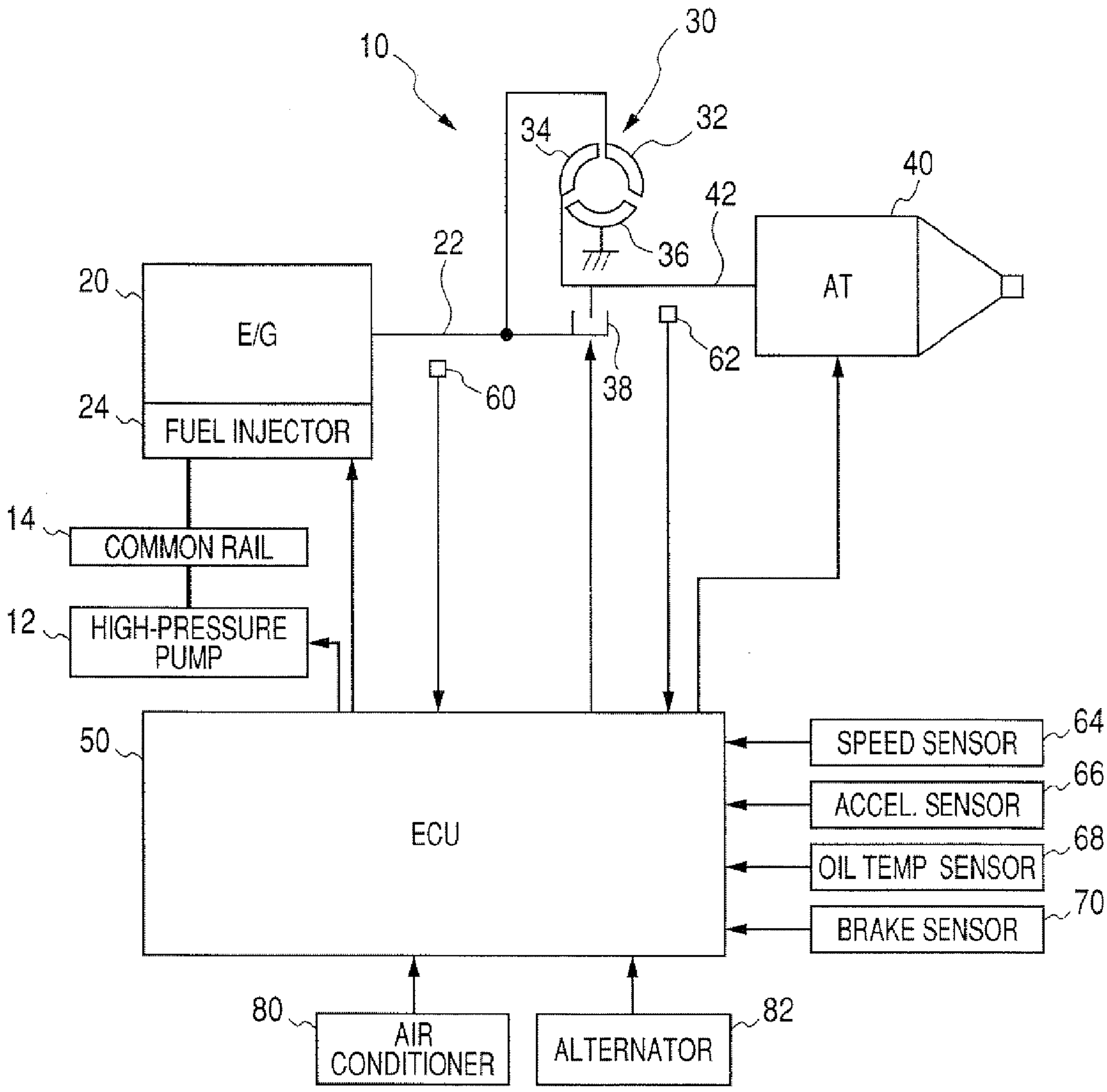
FIG. 1 is a block diagram which illustrates a fuel injection system according to the invention.

Referring to the drawings, wherein like reference numbers refer to like parts in several views, particularly to FIG. 1, there is shown an accumulator fuel injection system 10 according to the invention which is engineered, as an example, as a common rail fuel injection system for automotive diesel engines.

The fuel injection system 10 includes a high-pressure pump 12, a common rail 14, fuel injectors 24, and an electronic control unit (ECU) 50 and works to control the injection of fuel into a diesel engine 20 which is connected to driven wheels of an automotive vehicle through a torque converter 30 and an automatic transmission 40.

The high-pressure pump 12 is of a typical known structure which has plungers reciprocating following rotation of a cam of a camshaft 22 of the diesel engine 20 to compress the fuel, as sucked into pressure chambers sequentially. The ECU 50 works to control the amount of current applied to a suction control valve (not shown) installed in the high-pressure pump 12 to regulate the amount of fuel to be sucked into the pressure chamber of the high-pressure pump 12 during a suction stroke of each of the plungers.

The common rail 14 serves as an accumulator in which the fuel, as fed from the high-pressure pump 12, is stored and kept in pressure at a high-level controlled based on an operating condition of the diesel engine 20. The pressure of fuel in the common rail 14 (which will also be referred to as a common rail pressure below) is regulated by the flow rate of the fuel discharged from the high-pressure pump 12 and a pressure-reducing valve (not shown) installed in the high-pressure pump 12.

The diesel engine 20, as referred to herein as an example, is a four-cylinder internal combustion engine. The fuel injectors 24 are installed one in each cylinder of the diesel engine 20 and work to spray the fuel into the respective cylinders. The ECU 50 works to open each of fuel injectors 24 several times to perform multi-injections of fuel into the engine 20 in each engine operating cycle (i.e., a four-stroke cycle) including intake or induction, compression, combustion, and exhaust. Specifically, the ECU 50 works to perform the pilot injection, the main injection, and the post injection in each engine operating cycle. Each of the fuel injectors 24 is implemented by a typical solenoid-operated valve designed to regulate the pressure of fuel within a control chamber which acts on a nozzle needle in a valve-closing direction to control the amount of fuel to be sprayed from the fuel injector 24.

The torque converter 30 and the automatic transmission 40 are installed in a power train (also called a drive train) which transmits output torque of the diesel engine 20 inputted from the crankshaft 22 to driven wheels (not shown) through an input shaft 42. The torque converter 30 has a pump impeller 32 and a turbine runner 34 disposed to face each other. The pump impeller 32 is joined to the crankshaft 22 of the diesel engine 20. The turbine runner 34 is joined to the input shaft 42 of the automatic transmission 40.

In operation of the torque converter 30, the turbine runner 34 is exposed to the inertia force of flow of oil arising from the rotation of the pump impeller 32 to rotate. A stator 36 is disposed between the pump impeller 32 and the turbine runner 34 and works to reshape and return the flow of oil from the turbine runner 34 to the pump impeller 32, thereby amplifying the torque.

The torque converter 30 works to transmit the output torque of the diesel engine 20 to the automatic transmission 40 while permitting the slippage of rotation of the input shaft 42 to the crankshaft 22 of the diesel engine 20.

A lock-up clutch 38 is controlled hydraulically by the ECU 50 to establish a direct connection between the crankshaft 22 and the input shaft 42. The engagement of the lock-up clutch 38 is controlled by hydraulic pressure, as produced by a hydraulic control system for the automatic transmission 40. When the lock-up clutch 38 connects the crankshaft 38 and the input shaft 42 directly, it eliminates the slippage between the crankshaft 22 and the input shaft 42.

The automatic transmission 40 is a typical multi-speed transmission equipped with a planetary gear set or a trochoid or belt continuously variable transmission. The gear of the automatic transmission 40 is changed by controlling the hydraulic control system equipped with solenoid valves through the ECU 50.

The ECU 50 serves as a fuel injection control device and is implemented by a typical microcomputer consisting essentially of a CPU, a ROM, a RAM, and a rewritable non-volatile memory such as a flash memory. The ECU 50 monitors outputs of a crank angle sensor 60, a turbine speed sensor 62, a vehicle speed sensor 64, an accelerator position sensor 66, an oil temperature sensor 68, and a brake sensor 70 to know an operating condition of the diesel engine 20. The accelerator position sensor 66 works to measure the position of the accelerator pedal of the vehicle (i.e., the degree of opening of the throttle valve). The ECU 50 also monitors operating conditions of electric loads such as an air conditioner 80 and the alternator 82.

The ECU 50 also works to monitor the operating condition of the diesel engine 20 and controls the energization of the high-pressure pump 12, the fuel injectors 24, the lock-up clutch 38, and the hydraulic control system of the automatic transmission 40 in order to keep the diesel engine 20 at a desired condition.

The ECU 50 also works to control the injection timing and the quantity of fuel to be sprayed (will also be referred to as an injection quantity below) by the fuel injectors 24 based on the operating condition of the diesel engine 20, as determined by the outputs of the above sensors. Specifically, the ECU 50 outputs an injection control pulse signal to each of the fuel injectors 24 to inject a controlled amount of fuel into the diesel engine 20 at a controlled timing. The increasing of the width of the injection control pulse will result in a increased time for which the control chamber of each of the fuel injectors 24 is opened to a low-pressure side to increase the injection quantity. The ECU 50 stores in the ROM or the flash memory a map listing a relation between the width of the injection control pulse and the injection quantity for each common rail pressure (i.e., the pressure of fuel to be sprayed from the fuel injectors 24).

The ECU 50 works to perform control tasks, as discussed below, according to control programs stored in the ROM or the flash memory.

1) The ECU 50 samples the output of the crank angle sensor 60 to determine the speed ω of the crankshaft 22 (i.e., the diesel engine 20) for each cylinder of the diesel engine 20. The speed ω of the crankshaft 22 is measured immediately before the injection timing of each of the fuel injectors 24. The ECU 50 determines a speed variation Δω that is a difference between the speed ω of the crankshaft 22, as determined last for each of the four cylinders of the diesel engine 20, and that, as determined 720° CA before.
2) The ECU 50 outputs the injection control signal to each of the fuel injectors 24 to specify the injection timing and the injection quantity thereof. The ECU 50 also enters an injection quantity learning mode to output the injection control pulse indicating a learning injection quantity to each of the fuel injectors 24. Specifically, the ECU 50 directs or instructs each of the fuel injectors 24 to spray a selected quantity (i.e., the learning injection quantity) of fuel for learning a fuel injection characteristic thereof.
3) The ECU 50 analyzes the speed variation Δω, as sampled in the injection quantity learning mode, and a variation in load acting on the crankshaft 22, as will be described later in detail, to determine an increase in speed of the crankshaft 22 arising from the spraying of the fuel in the injection quantity learning mode (which will also be referred to as learning injection below).

Figure 2A:
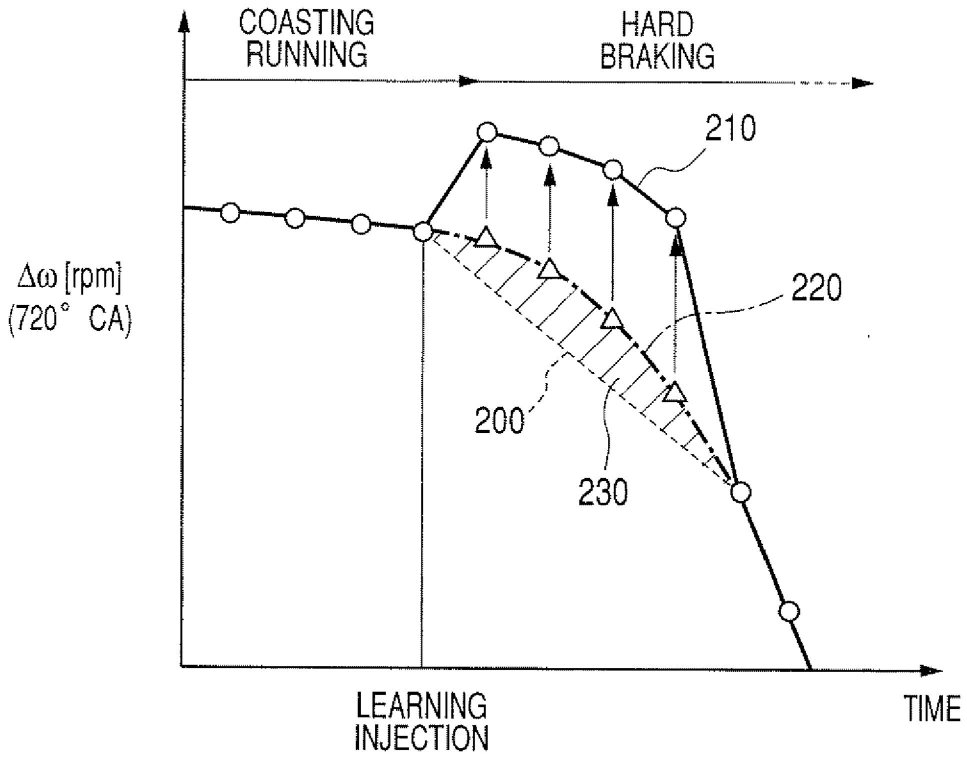
FIG. 2(*a*) is a graph which demonstrates variations $\Delta\omega$ in speed of an internal combustion engine, as sampled for respective four cylinders of the engine, when the driver of the vehicle has depressed the brake pedal suddenly in an injection quantity learning mode.
Figure 2B:
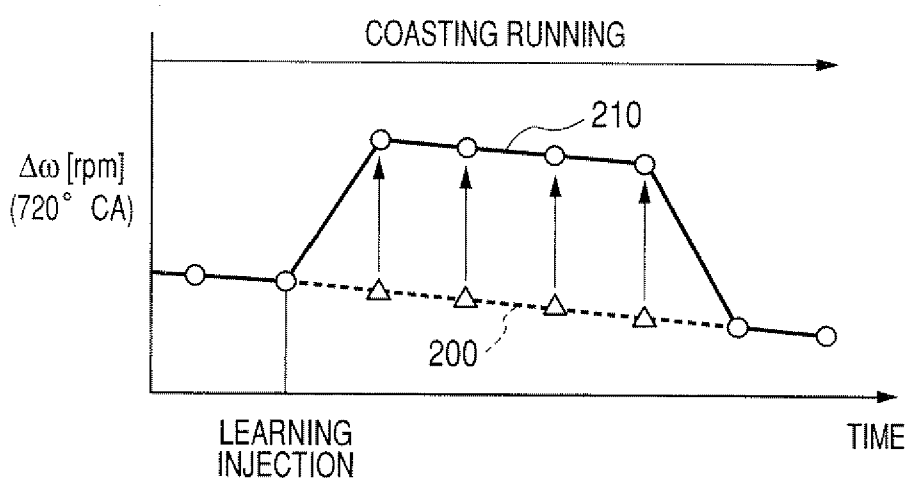

FIG. 2(*a*) demonstrates the speed variations Δω, that are variations in speed of the diesel engine 20 (i.e., the crankshaft 22), as sampled for the respective four cylinders, when the driver of the vehicle has depressed the brake pedal hard in the injection quantity learning mode. FIG. 2(*b*) demonstrates the speed variations Δω, as sampled when the acceleration pedal is released to decelerate the vehicle without spraying the fuel through the fuel injectors 24.

In the example of FIG. 2(*b*), a change in the speed variation Δω, as indicated by "Δ", when the learning injection is not performed substantially coincides with a broken line 200 passing straight through the speed variations Δω, as sampled before and after the learning injection is performed. The increase in speed of the diesel engine 20 may, therefore, be found directly by calculating a difference between a solid line 210 representing the speed variations Δω, as measured from the output of the crank angle sensor 60, and the broken line 200.

In the example of FIG. 2(*a*) where a positive variation in load arising from the hard braking acts on the crankshaft 22, the speed variations Δω when the learning injection is not performed change moderately along a chain line 220. A change in the speed variation Δω indicated by the broken line 200 passing straight through the speed variations Δω, as sampled before and after the learning injection is performed, is smaller than that, as indicated by the chain line 220. This will cause the increase in speed of the diesel engine 20 arising from the learning injection to be determined in error as being greater than actual when it is, like in FIG. 2(*b*), calculated as a difference between the solid line 210 representing the speed variations Δω, as measured from the output of the crank angle sensor 60, and the broken line 200.

The above error may be eliminated by correcting or decreasing the increase in speed of the diesel engine 20 based on the size of a hatched area 230, as enclosed by the chain line 220 and the broken line 200. The greater the size of the hatched area 230 that is a function of a difference in the speed variation Δω between the chain line 220 and the broken line 200, the greater the amount by which the increase in speed of the diesel engine 20 is to be decreased.

Figure 3:
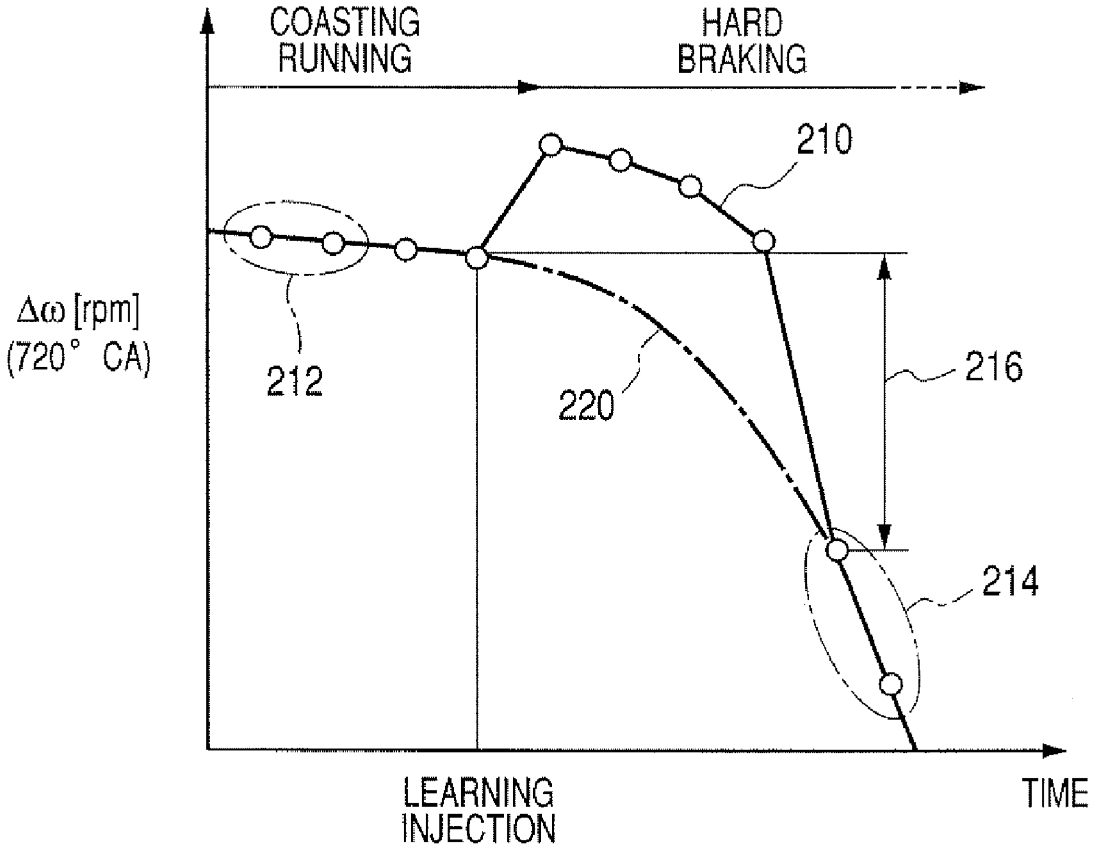
FIG. 3 is a graph which demonstrates variations $\Delta\omega$ in speed of an internal combustion engine, as sampled during deceleration of the engine before and after an injection quantity learning mode.

Alternatively, the increase in speed of the diesel engine 20 from the chain line 220 to the solid line 210 may also be calculated based on the speed variations Δω indicated by the chain line 220. The chain line 220 may be derived mathematically using a rate of change 212, as shown in FIG. 3, in speed of the diesel engine 20 before the learning injection is performed and a rate of change 214 in speed of the diesel engine 20 after the learning injection is performed.

4) The ECU 50 is designed to halt the injection quantity learning mode, i.e., stops learning or correcting the fuel injection characteristic of each of the fuel injectors 24 when the degree of variation in load acting on the crankshaft 22, that is, the difference in speed variation Δω between the chain line 220 and the broken line 200.

5) The ECU 50 calculates the quantity of fuel considered as having been sprayed actually by the fuel injectors 24 (will also be referred to as an actual injection quantity) based on the increase in speed of the crankshaft 22, as determined in the above manner, in view of the variation in load on the crankshaft 22. The ECU 50 also corrects the actual injection quantity as a function of a slippage percentage SR that is a function of a difference in speed between the crankshaft 22 and the input shaft 42. The slippage percentage SR is given by an equation (1) below.

$$SR=(|NE-NO|/NE)\times 100 \tag{1}$$

where NE is the speed of the crankshaft 22, and NO is the speed of the input shaft 42.

6) The ECU 50 calculates a difference between the learning injection quantity that is, as described above, a target quantity of fuel to be sprayed by each of the fuel injectors 24 in the injection quantity learning mode and the actual injection quantity to determine a correction factor for use in correcting the fuel injection characteristic of each of the fuel injectors 24. The fuel injection characteristic, as referred to herein, shows the relation between the width of the injection control pulse to be outputted to a corresponding one of the fuel injectors 24 and the injection quantity expected to be sprayed from the one of the fuel injectors 24.

7) The ECU 50 determines whether the variation in load is occurring and exerted on the crankshaft 22 or not. The variation in load acting on the crankshaft 22 is broken down into two types: one being a positive variation in load oriented to decrease the speed of the crankshaft 22, and the second being a negative variation in load oriented to increase the speed of the crankshaft 22. Specifically, the ECU 50 works to concludes that the variation in load is being exerted on the crankshaft 22 in the following cases:

7a) when a difference between the rate of change 212, as shown in FIG. 3, in speed variation Δω before the learning injection is performed and the rate of change 214 in speed variation Δω after the learning injection is performed is greater than a given value or a difference 216 between the speed variations Δω before and after the learning injection is performed is greater than a given value;

7b) when the output of the brake sensor 70 indicates the fact that the brake pedal has been depressed or released;

7c) when the electric load such as the air conditioner 80 and/or the alternator 82 which is to be driven by the crankshaft 22 in mechanical connection therewith has been switched from the off- to the on-state or the on- to the off-state; and 7d) when the gear of the automatic transmission 40 has been changed, for example, when the automatic transmission 40 has been changed from the third-speed gear to the second-speed gear, so that the positive variation in load acts on the crankshaft 22 or from the second-speed gear to the third-speed gear, so that the negative variation in load acts on the crankshaft 22.

8) The ECU 50 works to determine whether the lock-up clutch 38 establishes or releases the connection between the crankshaft 22 and the input shaft 42.

9) The ECU 50 works to determine that a learning requirement is met when the acceleration pedal is released to decelerate the vehicle without spraying the fuel into the diesel engine 20 and the lock-up clutch 38 is disengaged to permit the crankshaft 22 and the input shaft 42 to slip in rotation.

Figure 4:
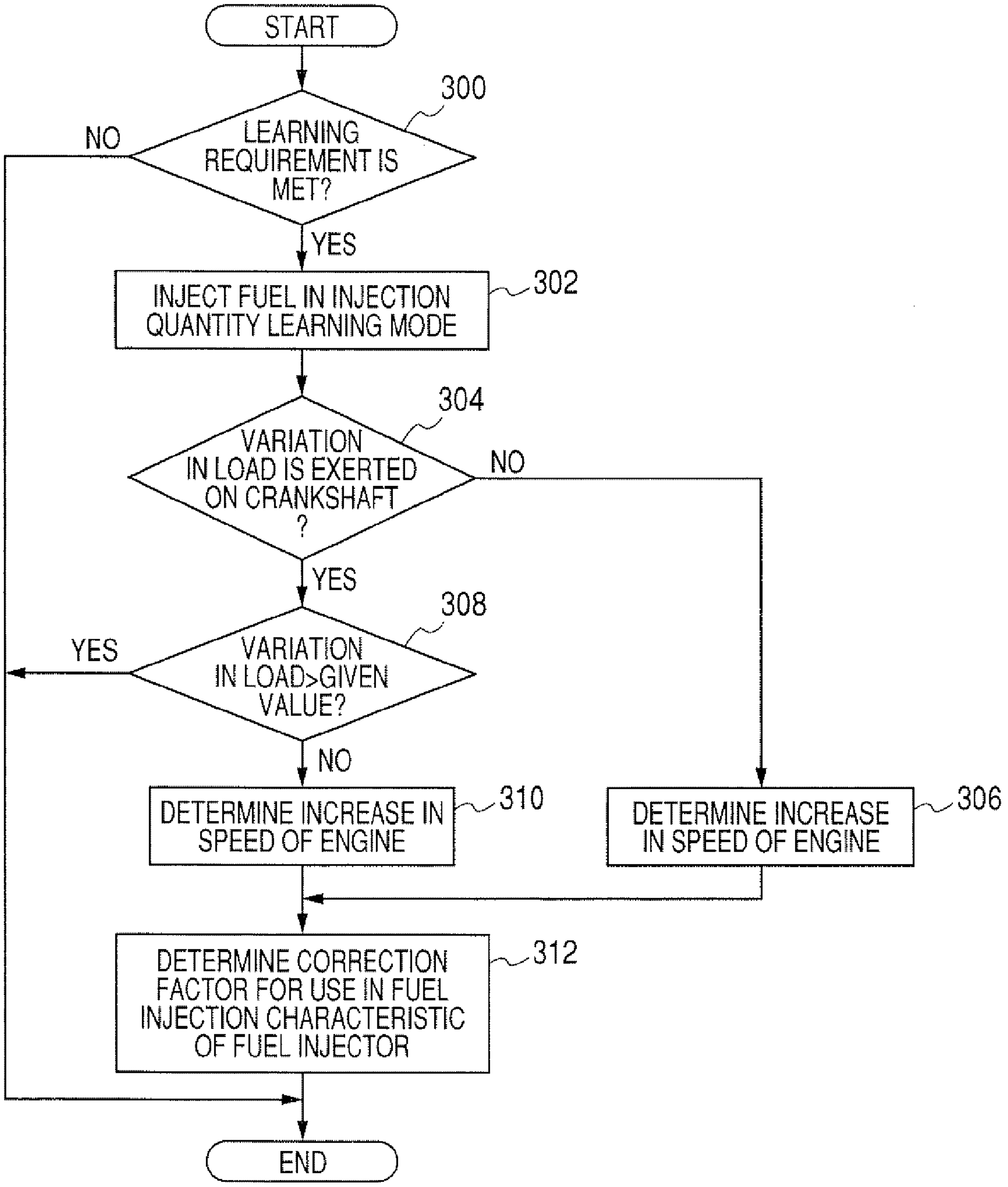
FIG. 4 is a flowchart of a program to learn the quantity of fuel actually sprayed from a fuel injector and calculate a correction factor for compensating for a deviation in an injection characteristic of the fuel injector.

The operation of the ECU 50 in the injection quantity learning mode will be described below in detail with reference to a flowchart of FIG. 4. The program, as illustrated in FIG. 4, is stored in the ROM or the flash memory in the ECU 50 and executed each time an injection control time to control the injection of fuel into each of the four cylinders of the diesel engine 20 is reached.

After entering the program, the routine proceeds to step 300 wherein it is determined whether the learning requirement to learn the fuel injection characteristic of each of the fuel injectors 24 is met or not. For instance, when the accelerator pedal is released to decelerate the diesel engine 20 without spraying the fuel thereinto through the fuel injectors 24, so that the speed of the crankshaft 22 is decreasing at a constant rate, and the lock-up clutch 38 is disengaged to permit the crankshaft 22 and the input shaft 42 to slip in rotation, the ECU 50 determines that the learning requirement is met. If a NO answer is obtained meaning that the learning requirement is not met, then the routine terminates.

If a YES answer is obtained in step 300, then the routine proceeds to step 302 wherein the ECU 30 enters the injection quantity learning mode and outputs the injection control pulse to a corresponding one of the fuel injectors 24 to establish a single injection of fuel of a quantity selected for learning the fuel injection characteristic. The quantity of fuel to be sprayed from the fuel injector 24 in the injection quantity learning mode is selected to be identical with that in the typical pilot injection. The ECU 50 may alternatively be designed to establish a sequence of injections of fuel into a corresponding one of the cylinders of the diesel engine 20. In this case, the ECU 50 divides the quantity of fuel, as derived by the increase in speed of the crankshaft 22 in a following step, by the number of the sequence of injections and defines it as the quantity of fuel used in one of the injection events.

The routine proceeds to step 304 wherein it is determined whether a variation in load has been exerted on the crankshaft 22 during the injection quantity learning mode (i.e., sampling of variations in speed of the crankshaft 22) or not. Specifically, the ECU 50 determines that the variation in load has acted on the crankshaft 22 when the brake pedal has been depressed. The ECU 50 may alternatively be designed to make such a determination, as described in the above section 7), based on the changing of the gear of the automatic transmission 40, the operating condition of the air conditioner 80 or the alternator 82, and/or a change in the speed variation Δω.

If a NO answer is obtained in step 304 meaning that the brake pedal is not depressed, so that no variation in load is exerted on the crankshaft 22, it is determined that the speed variation Δω when the learning injection is not performed will change along the broken line 200, as illustrated in FIG. 2(*b*). The routine then proceeds to step 306 wherein the increase in speed of the crankshaft 22 is calculated from a difference between the speed variation Δω, as indicated by the solid line 210, occurring when the learning injection is performed and the speed variation Δω, as indicated by the broken line 200, occurring when the learning injection is not performed. The routine then proceeds to step 312.

Alternatively, if a NO answer is obtained in step 304 meaning that the brake pedal is depressed to exert the variation in load on the crankshaft 22, then the routine proceeds to step 308 wherein it is determined whether an absolute value of the variation in load is greater than a given value or not. The value of the variation in load is calculated, as described above, from a difference in speed variation Δω between the chain line 220 and the broken line 200 in FIG. 2(*a*). The value of the variation in load may alternatively be derived from a difference between the rate of change 212, as shown in FIG. 3, in speed variation Δω before the learning injection is performed and the rate of change 214 in speed variation Δω after the learning injection is performed is greater than a given value or a difference 216 between the speed variations Δω before and after the learning injection is performed.

If a YES answer is obtained in step 308 meaning that the variation in load is too great to correct the quantity of fuel to be sprayed into the diesel engine 20 accurately, then the routine terminates without correcting the fuel injection characteristic of a corresponding one of the fuel injectors 24.

Alternatively, if a NO answer is obtained in step 308, then the routine proceeds to step 310 wherein a difference in speed variation Δω between the chain line 220 and the broken line 200 is subtracted from a difference in speed variation Δω between the solid line 210 and the broken line 200 to determine the increase in speed variation Δω, that is, the increase in speed of the crankshaft 22 arising from the event of the learning injection. The increase in speed may alternatively be determined, as described above, by defining the speed variation Δω, as indicated by the chain line 220, as a reference speed variation and calculating a derivation of the speed variation Δω, as indicated by the solid line 210, from that, as indicated by the chain line 220.

The routine proceeds to step 312 wherein the actual injection quantity, that is, the quantity of fuel viewed as being actually sprayed from a corresponding one of the fuel injectors 24 is calculated based on the increase in speed, as derived in either of step 306 or 310. The ECU 50 also calculates a difference between the actual injection quantity and the learning injection quantity that is, as described above, a target quantity of fuel to be sprayed by the corresponding one of the fuel injectors 24 in the injection quantity learning mode to determine the correction factor for use in correcting the fuel injection characteristic of the corresponding one of the fuel injectors 24 which shows the relation between the width of the injection control pulse to be outputted to the corresponding one of the fuel injectors 24 and the injection quantity expected to be sprayed therefrom.

The ECU 50 is, as described above, designed to correct the increase in speed of the crankshaft 22 accurately based on the variation in load acting on the crankshaft 22 that is a driving member of the power train (i.e., a torque transmission mechanism) when it is determined that the variation in load is being exerted on the crankshaft 22 during the injection quantity learning mode, thus ensuring the accuracy in determining the actual injection quantity using the corrected increase in speed to derive the correction factor based on the difference between the actual injection quantity and the learning injection quantity for correcting the target quantity of fuel to be sprayed from one of the fuel injectors 24. This enables a small quantity of fuel which is to be sprayed, for example, in the pilot injection taken place before the main injection to be determined accurately in the common rail fuel injection systems.

The increase in speed of the crankshaft 22 is, as described above, determined by the difference in speed variation Δω between when the learning fuel injection is performed and when it is not performed, however, it may be determined by a difference between the speed ω of the crankshaft 22, as measured directly by the crank angle sensor 60 when the learning injection is performed, and the speed ω of the crankshaft 22 at the same crank angle when the learning injection is not performed. The speed ω of the crankshaft 22 at a crank angle corresponding to a selected one of the cylinders of the diesel engine 20 when the learning injection is not performed may be calculated mathematically from a rate of change in speed of the crankshaft 22 before the learning injection is performed.

In the program of FIG. 4, when the degree of variation in load exerted on the crankshaft 22 which has arisen from the depression of the brake pedal is greater than the given value, the ECU 30 stops learning the fuel injection characteristic, i.e., determining the correction factor for the fuel injectors 24, but may alternatively be designed to monitor the operating condition of the brake pedal, the automatic transmission 40, the air conditioner 80, or the alternator 82 and stop determining the correction factor when the monitored condition indicates that the variation in load is being exerted on the crankshaft 22. For instance, the value with which the absolute value of the variation in load on the crankshaft 22 is compared in step 308 may be set to a very small value or zero, so that when a YES answer is obtained in step 304, the routine will terminate through step 308 without determining the correction factor.

The ECU 50 may alternatively be designed to calculate the increase in speed variation Δω in step 310 without comparing the degree of the variation in load is compared with the given value in step 308 whenever it is determined in step 304 that the variation in load is being exerted on the crankshaft 22.

Instead of the automatic transmission 40, a manual transmission may be used which has the input shaft 42 joined to the crankshaft 22 through a clutch. In this case, the ECU 50 may determine that the learning requirement is met when the clutch is disengaged.

The ECU 50 in the above embodiment works to learn the quantity of fuel sprayed in the pilot injection mode in the accumulator fuel injection system 10 which inject the fuel, as stored in the common rail 14, into each of the cylinders of the diesel engine 20 through one of the fuel injectors 24, but may alternatively be designed to learn the quantity of fuel sprayed in the main injection mode or the after-injection mode taken place after the main injection mode.

The invention may be employed with a fuel injection system which inject the fuel into a gasoline engine through fuel injectors without using the common rail 14.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A fuel injection control apparatus for an internal combustion engine comprising:

a speed sensor that measures a speed of an internal combustion engine;

a controller working to control a quantity of fuel to be injected from a fuel injector into the internal combustion engine, when it is required to enter an injection quantity learning mode, said controller controlling the fuel injector to spray a learning injection quantity of the fuel that is a quantity of the fuel to be injected into the internal combustion engine for learning a fuel injection characteristic of the fuel injector, said controller determining an increase in speed of the internal combustion engine through said speed sensor which has arisen from spraying of the learning injection quantity of the fuel and also determining an actual injection quantity of the fuel that is an quantity of the fuel considered as having been sprayed from the fuel injector based on the increase in speed of the internal combustion engine, said controller calculating a correction factor based on a difference between the learning injection quantity and the actual injection quantity for compensating for the difference, said controller also determining a variation in load acting on a driving member of a torque transmission mechanism through which an output torque of the internal combustion engine is transmitted from the driving member to a driven member, when an absolute value of the variation in load is greater than a given value, said controller halting the injection quantity learning mode.

2. A fuel injection control apparatus as set forth in claim 1, wherein said controller determines the increase in speed of the internal combustion engine based on the speed of the internal combustion engine, as measured by the speed sensor, and the variation in load acting on the driving member.

3. A fuel injection control apparatus as set forth in claim 1, wherein said controller determines the variation in load acting on the driving member based on a change in speed of the internal combustion engine between before and after the learning injection quantity of the fuel is sprayed.

4. A fuel injection control apparatus as set forth in claim 1, wherein when a load-generating object connected directly to the driving member is actuated, said controller determines that the variation in load is exerted on the driving member and also determines whether the absolute value of the variation in load is greater than the given value or not.

5. A fuel injection control apparatus as set forth in claim 1, wherein when an output from a brake sensor indicates depression of a brake pedal for the internal combustion engine, said controller determines that the variation in load is exerted on the driving member and also determines whether the absolute value of the variation in load is greater than the given value or not.

6. A fuel injection control apparatus as set forth in claim 1, wherein when a gear of a transmission installed in the torque transmission mechanism is changed, said controller determines that the variation in load is exerted on the driving member and also determines whether the absolute value of the variation in load is greater than the given value or not.

7. A fuel injection control apparatus as set forth in claim 1, wherein said controller calculates the absolute value of the variation in load acting on the driving member based on a difference in speed between before and after the learning injection quantity of the fuel is sprayed by the fuel injector.

8. A fuel injection control apparatus as set forth in claim 1, wherein the variation in load acting on the driving member is either of a positive variation in load oriented to decrease the speed of the internal combustion engine or a negative variation in load oriented to increase the speed of the internal combustion engine, and wherein said controller determines at least the positive variation in load.

9. A fuel injection control apparatus as set forth in claim 1, wherein said controller determines whether the driving member and the driven member are slipping in rotation or not, and wherein when it is determined that the driving member and the driven member are slipping in rotation, said controller enters the injection quantity learning mode.

10. A fuel injection control apparatus for an internal combustion engine comprising:

a speed sensor that measures a speed of an internal combustion engine;

a controller working to control a quantity of fuel to be injected from a fuel injector into the internal combustion engine, when it is required to enter an injection quantity learning mode, said controller controlling the fuel injector to spray a learning injection quantity of the fuel that is a quantity of the fuel to be injected to the internal combustion engine for learning a fuel injection characteristic of the fuel injector, said controller determining a variation in load acting on a driving member of a torque transmission mechanism through which an output torque of the internal combustion engine is transmitted from the driving member to a driven member, said controller also determining an increase in speed of the internal combustion engine through said speed sensor which has arisen from spraying of the learning injection quantity of the fuel based on the speed of the internal combustion engine, as measured by the speed sensor, and the variation in load acting on the driving member, said controller also determining an actual injection quantity of the fuel that is an quantity of the fuel considered as having been sprayed from the fuel injector based on the increase in speed of the internal combustion engine, said controller calculating a correction factor based on a difference between the learning injection quantity and the actual injection quantity to compensate for the difference for directing the fuel injector to spray a target quantity of the fuel.

11. A fuel injection control apparatus as set forth in claim 10, wherein said controller determines the variation in load acting on the driving member based on a change in speed of the internal combustion engine between before and after the learning injection quantity of the fuel is sprayed.

12. A fuel injection control apparatus as set forth in claim 10, wherein when a load-generating object connected directly to the driving member is actuated, said controller determines that the variation in load is exerted on the driving member and also determines whether the absolute value of the variation in load is greater than the given value or not.

13. A fuel injection control apparatus as set forth in claim 10, wherein when an output from a brake sensor indicates depression of a brake pedal for the internal combustion engine, said controller determines that the variation in load is exerted on the driving member and also determines whether the absolute value of the variation in load is greater than the given value or not.

14. A fuel injection control apparatus as set forth in claim 10, wherein when a gear of a transmission installed in the torque transmission mechanism is changed, said controller determines that the variation in load is exerted on the driving member and also determines whether the absolute value of the variation in load is greater than the given value or not.

15. A fuel injection control apparatus as set forth in claim 10, wherein said controller calculates the absolute value of the variation in load acting on the driving member based on a difference in speed between before and after the learning injection quantity of the fuel is sprayed by the fuel injector.

16. A fuel injection control apparatus as set forth in claim 10, wherein the variation in load acting on the driving member is either of a positive variation in load oriented to decrease the speed of the internal combustion engine or a negative variation in load oriented to increase the speed of the internal combustion engine, and wherein said controller determines at least the positive variation in load.

17. A fuel injection control apparatus as set forth in claim 10, wherein said controller determines whether the driving member and the driven member are slipping in rotation or not, and wherein when it is determined that the driving member and the driven member are slipping in rotation, said controller enters the injection quantity learning mode.

* * * * *